United States Patent [19]

Nakane et al.

[11] Patent Number: 5,154,055
[45] Date of Patent: Oct. 13, 1992

[54] APPARATUS FOR DETECTING PURIFICATION FACTOR OF CATALYST

[75] Inventors: Hiroaki Nakane, Anjo; Katsuhiko Nakabayashi, Handa; Noriaki Kurita, Nagoya, all of Japan

[73] Assignee: Nippondenso Co., Ltd., Kariya, Japan

[21] Appl. No.: 642,310

[22] Filed: Jan. 18, 1991

[30] Foreign Application Priority Data

Jan. 22, 1990 [JP] Japan ................... 2-013219
Oct. 18, 1990 [JP] Japan ................... 2-281290

[51] Int. Cl.⁵ .............................................. F01N 3/20
[52] U.S. Cl. ........................................... 60/276; 60/277
[58] Field of Search ..................... 60/274, 276, 277

[56] References Cited

U.S. PATENT DOCUMENTS 3,962,866  6/1976  Neidhard et al. .
3,969,932  7/1976  Rieger et al. .
4,007,589  2/1977  Neidhard et al. .
4,622,809  11/1986 Abthoff ................. 60/276
4,739,614  4/1988  Katsumo et al. .
5,018,348  5/1991  Durschmidt ............ 60/274

FOREIGN PATENT DOCUMENTS 49-109721 10/1974 Japan .
63-97852  4/1988 Japan .
45913    2/1989 Japan ................... 60/276

Primary Examiner—Douglas Hart
Attorney, Agent, or Firm—Cushman, Darby & Cushman

[57] ABSTRACT

An apparatus for detecting a purification factor of a catalyst for purifying an exhaust gas of an internal combustion engine comprises a catalyst disposed in an exhaust system of the internal combustion engine for purifying an exhaust gas, first and second air-fuel ratio sensors disposed upstream and downstream of the catalyst for detecting air-fuel ratios, respectively, a response delay time difference detecting device for detecting differences in response delay time between the first and second air-fuel ratio sensors in respective different operation states of the engine, a purification factor detecting device for detecting a purification factor of the catalyst on the basis of a deviation between the first and second response delay time differences detected in respective different operation states of the engine. Since the purification factor of the catalyst is detected on the basis of a deviation between the first and second response delay time differences detected in the respective different engine operation states, the purification factor of the catalyst can be detected with high accuracy independently of response characteristics of the first and second air-fuel ratio sensors themselves.

11 Claims, 12 Drawing Sheets

APPARATUS FOR DETECTING PURIFICATION FACTOR OF CATALYST

BACKGROUND OF THE INVENTION

1. Field Of The Invention

The present invention relates to an apparatus for detecting a purification factor of a catalyst disposed in an exhaust system of an internal combustion engine for purifying an exhaust gas thereof.

2. Description Of The Related Art

As a conventional catalyst purification factor detecting apparatus, there is known an apparatus having such a structure that oxygen sensors are disposed at locations upstream and downstream of a catalyst, respectively, and the purification factor of the catalyst is detected on the basis of response delay times of the oxygen sensors (reference is made, for example, to U.S. Pat. No. 3,969,932).

The prior art apparatus suffers from such problems as mentioned below. The response delay time contains a response time of the oxygen sensor itself. This response time differs between respective oxygen sensors. Besides, the response time changes due to a change in the characteristics of the oxygen sensor caused by a change with time of the oxygen sensor. For these reasons, it is impossible or at least very difficult to detect the purification factor of a catalyst only on the basis of the response delay time with satisfactory accuracy.

SUMMARY OF THE INVENTION

Accordingly, it is an object of the present invention to provide an apparatus which is capable of detecting a purification factor of a catalyst for purifying an exhaust gas of an internal combustion engine with improved accuracy.

In view of the above and other objects which will become apparent from the following description, there is provided, according to an aspect of the present invention, a catalyst disposed in an exhaust system of the internal combustion engine for purifying an exhaust gas, first and second air-fuel ratio sensors disposed upstream and downstream of the catalyst for detecting air-fuel ratios, respectively, response delay time difference detecting means for detecting differences in response delay time between the first and second air-fuel ratio sensors in respective different operation states of the engine, purification factor detecting means for detecting a purification factor of the catalyst on the basis of a deviation between first and second response delay time differences detected in the respective different operation states of the engine.

DESCRIPTION OF THE PREFERRED EMBODIMENTS

The present invention will be described with respect to an embodiment thereof applied to an internal combustion engine for a motor vehicle in conjunction with the accompanying drawings.

Figure 1:
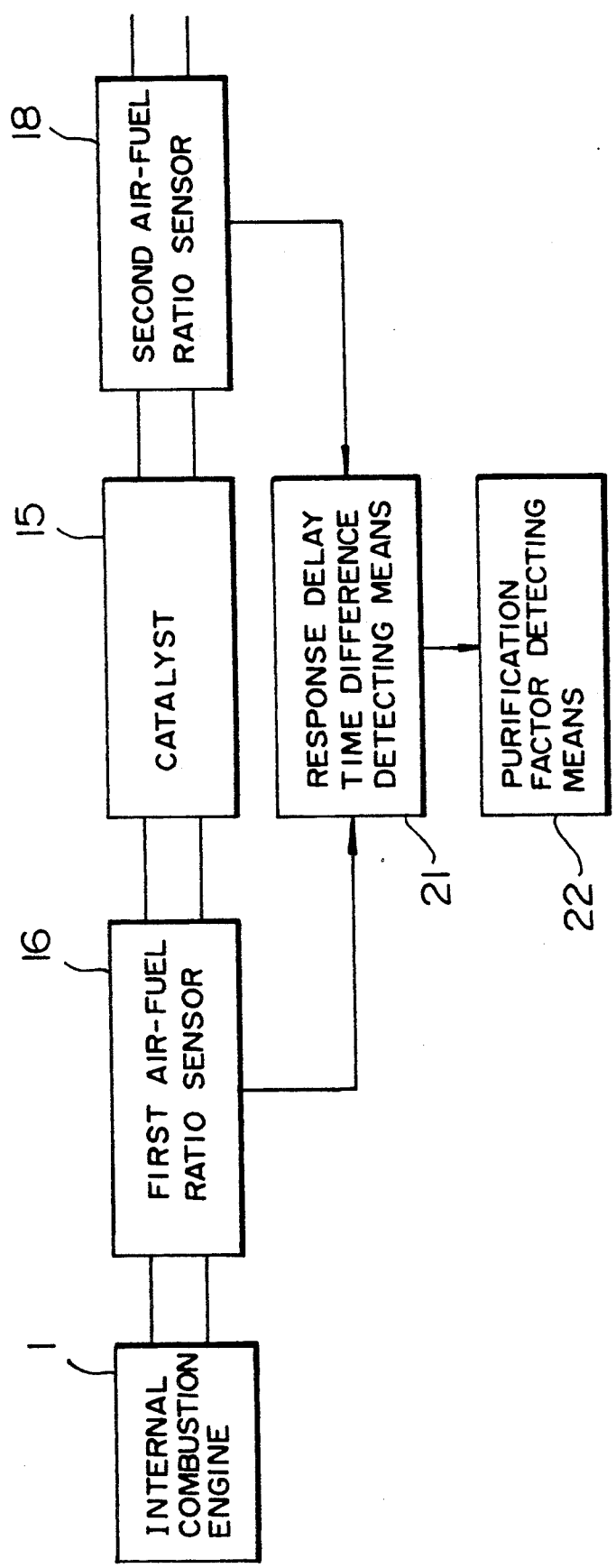
FIG. 1 is a functional block diagram showing a general structure of a catalyst purification factor detecting apparatus of an embodiment of the invention.
Figure 2:
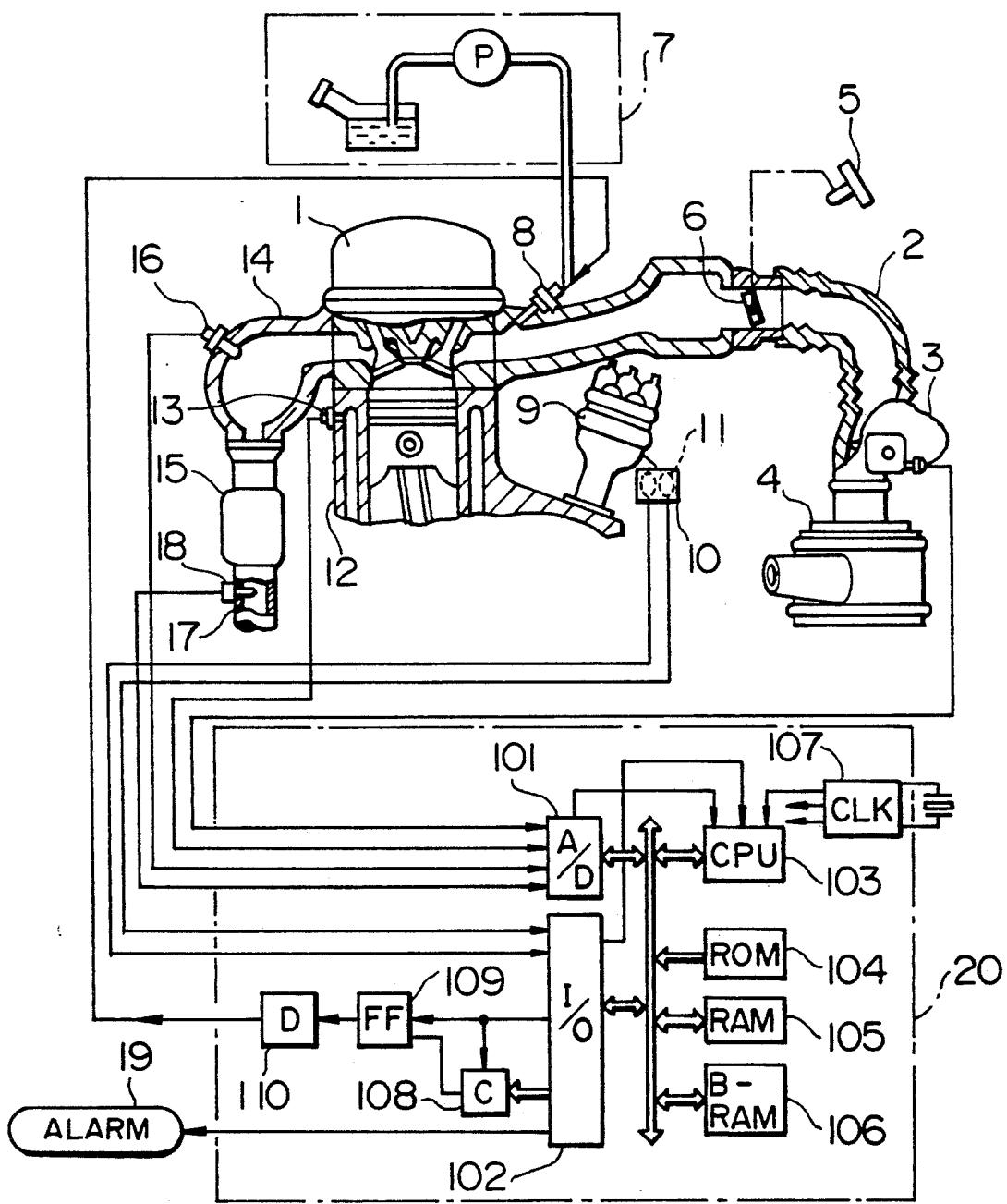
FIG. 2 shows schematically an internal combustion engine system to which an embodiment of the invention is applied.

FIG. 2 shows schematically a general structure of the apparatus according to an embodiment of the invention in the style of functional blocks. Referring to the figure, an air flow meter 3 is disposed in an intake air passage 2 of an internal combustion engine 1 (hereinafter referred to simply as the engine). The air flow meter 3 is adapted to measure directly an amount of intake air flow introduced through an air cleaner 4. Further, disposed within the intake air passage 2 is a throttle valve 6 which is opened or closed in response to the actuation of an accelerator pedal by a driver, thereby regulating or adjusting an intake air flow amount supplied to the engine 1. Provided at every engine cylinder is a fuel injection valve 8 for supplying pressurized fuel from a fuel supply system 7 to an intake port of the engine.

Provided in a distributor 9 are a reference position sensor for generating a reference position detecting signal at every crank angle of 720° and a crank angle sensor 11 for producing a crank angle detecting signal at every crank angle of 30°.

Further provided in a water jacket 12 of each engine cylinder block is a water temperature sensor 13 for detecting the temperature of a cooling water.

On the other hand, an exhaust system includes a three-way catalytic converter (TWC) 15 which is disposed downstream of an exhaust gas manifold 14 for purifying an exhaust gas by removing simultaneously three noxious or harmful components therein, HC, CO and $NO_x$, a first oxygen sensor (also referred to as $O_2$-sensor) 16 acting as a first air-fuel ratio sensor which is disposed at a position upstream of the TWC 15, i.e. within the exhaust gas manifold 14, and a second O₂-sensor 18 acting as a second air-fuel ratio sensor which is disposed within an exhaust pipe 17, at a position downstream of the TWC 15. As is well known, the first and second O₂-sensors 16 and 18 operate respectively to produce different output voltages in dependence on whether the air-fuel ratio is lean or rich as compared with the stoichiometric air-fuel ratio.

A reference numeral 19 designates an alarm for generating an alarm message to be supplied to the driver when a purification factor $\alpha$ of the TWC 15 becomes lower than a predetermined value.

An electronic control unit (hereinafter abbreviated as ECU) 20 is formed of a microcomputer, for example, and it comprises an A/D converter 101, an I/0 port 102, a CPU 103, a ROM 104, a RAM 105, a back-up RAM 106, a clock generator circuit 107 and others, as is known in the art.

The ECU 20 calculates a basic fuel injection quantity as a function of the intake air flow amount $Q_a$ detected by the air flow meter 3, the temperature THW of the cooling water detected by the coolant temperature sensor 13, the rotational speed NE which is calculated on the basis of the crank angle detection signal outputted from the crank angle sensor 11, etc. Then, a fuel injection quantity TAU is determined by correcting the basic fuel injection quantity in accordance with the output signals of the first and second O₂-sensors 16 and 18 so that the purification factor $\alpha$ of the TWC 15 becomes maximum. Subsequently, a control signal corresponding to the fuel injection quantity TAU is supplied to the fuel injection valve 8 through the I/0 port 102.

The ECU 20 further includes a down-counter 108, a flip-flop 109 and a driver circuit 110 for controlling the fuel injection valve 8. More specifically, when the fuel injection quantity TAU is calculated through the execution of a routine which will be described later, the fuel injection quantity TAU is preset at the down-counter 108 with the flip-flop 109 being set simultaneously. In response thereto, the driver circuit 110 starts energization of the fuel injection valve 8. In the meanwhile, the down-counter 108 counts clock pulses generated by a clock generator (not shown). When a carry-out terminal of the counter 108 assumes logic "1" level, the flip-flop 109 is reset, thereby causing the driver circuit 110 to stop the energization of the fuel injection valve 8. In this manner, the fuel injection valve 8 is energized during an injection period corresponding to the fuel injection quantity TAU mentioned above, whereby the fuel is supplied to a combustion chamber of the engine 1 by an amount corresponding to the fuel injection quantity TAU.

Now, a description will be directed to the detection of the purification factor $\alpha$ of the TWC 15.

Figure 3:
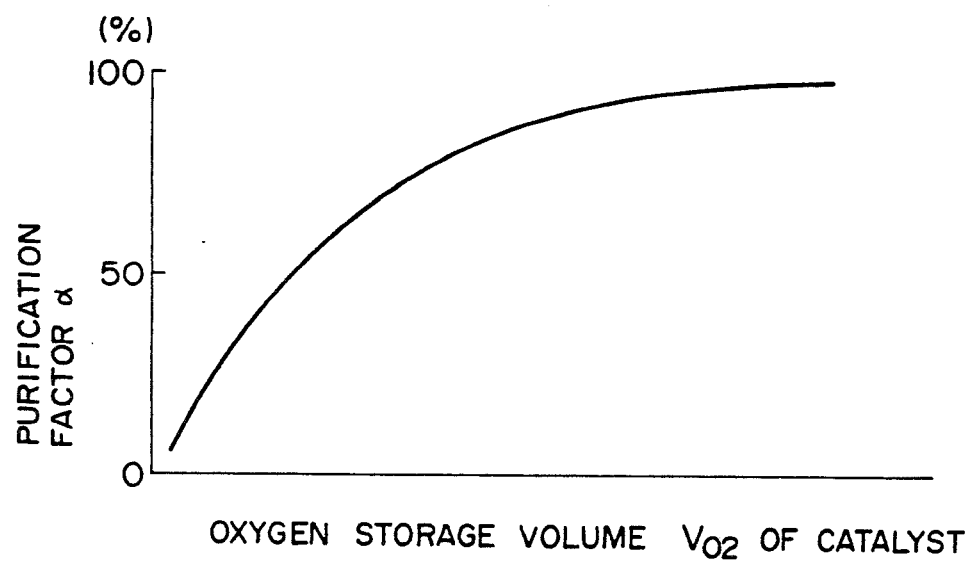
FIG. 3 is a characteristic diagram for graphically illustrating a relation between a purification factor $\alpha$ of a ternary catalyst and an oxygen storage volume thereof.
Figure 4:
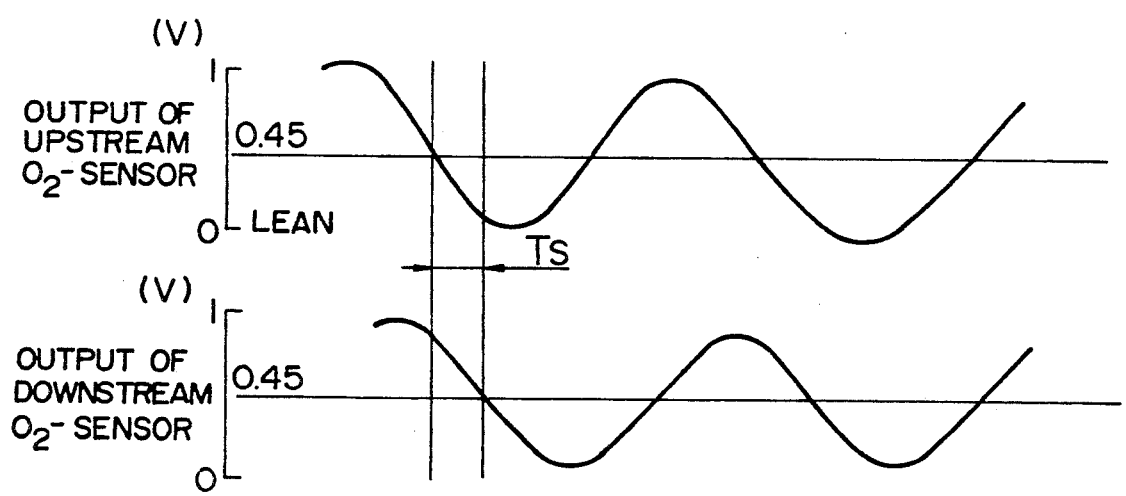
FIG. 4 is a timing diagram for illustrating output timings of first and second $O_2$-sensors employed in the system shown in FIG. 2.

FIG. 3 illustrates a relation between the purification factor $\alpha$ of the TWC 15 and an oxygen storage volume $V_{O2}$ thereof. The oxygen storage volume $V_{O2}$ of the TWC 15 can be obtained from a difference ($T_s$ in FIG. 4) in response delay time (hereinafter referred to as a response delay time difference) between the first and second O₂-sensors 16 and 18 disposed, respectively, upstream and downstream of the TWC 15.

In the case where an oxygen gas is caused to flow in the state where no oxygen is stored in the TWC 15 at all (i.e. a rich state), a response delay time difference $T_s$ between the first and second O₂-sensors 16 and 18 can be obtained in the manner described below. A response delay time $T_F$ between a change of a mixture gas supplied to the engine 1 from a rich state to a lean state and a change of the output signal of the first O₂-sensor 16 from a rich level (1 V) to a lean level (0 V) can be given by the following equation:

$$T_F = t_1 + D_1 \quad (1)$$

where $t_1$ represents a delay time spent by an exhaust gas while it leaves the engine 1 and reaches the upstream-side O₂-sensor 16 and $D_1$ represents a response time of the upstream-side O₂-sensor 16 itself.

On the other hand, a response delay time $T_R$ of the second O₂-sensor 18 is given by the following equation:

$$T_R = t_1 + t_2 + V_{O2}/Q_{O2} + t_3 + D_2 \quad (2)$$

where $t_2$ represents a delay time spent by an exhaust gas while it passes by the first O₂-sensor 16 and reaches the TWC 15, $V_{O2}$ represents an oxygen storage volume of the TWC 15, $Q_{O2}$ represents an oxygen content of the exhaust gas, namely, an amount of oxygen contained in the exhaust gas, $V_{O2}/Q_{O2}$ represents a time which has elapsed before the oxygen storage volume $V_{O2}$ of the TWC 15 reaches a maximum limit thereof, $t_3$ represents a delay time spent by the exhaust gas while it passes by the TWC 15 and reaches the second O₂-sensor 18, and $D_2$ represents a response time of the second O₂-sensor 18. From the equations (1) and (2g), the response delay time difference $T_s$ can be given by the following equation:

$$\begin{aligned} T_s &= T_R - T_F \\ &= V_{O2}/Q_{O2} + (D_2 - D_1) + (t_2 + t_3) \end{aligned} \quad (3)$$

As is apparent from the above equation (3), the oxygen storage volume $V_{O2}$ can be determined on the basis of the response delay time difference $T_s$, the oxygen flow amount $Q_{O2}$, the delay time sum of the exhaust gas $(t_2 + t_3)$ which will hereinafter be represented by $D_{Gas}$, and a difference in the response time $(D_2 - D_1)$ between the O₂-sensors 16 and 18. Here, it is noted that it is difficult to determine the sensor response time difference $(D_2 - D_1)$, because of non-uniformity of the sensors themselves, changes of the sensor characteristics, etc.

Under the circumstances, consideration is made of a difference or deviation $\Delta T_s$ between first and second response delay time differences $T_s$ and $T_s'$ in respective different operation states of the engine. The deviation $\Delta T_s$ can be given by the following equation:

$$\Delta T_s = T_s - T_s' = V_{O2} \times \left( \frac{1}{Q_{O2}} - \frac{1}{Q_{O2}'} \right) + \Delta D_{Gas} \quad (4)$$

where $\Delta D_{Gas} = (t_2 + t_3) - (t_2' + t_3')$.

Further, the oxygen content $Q_{O2}$ of the exhaust gas can be given by $$Q_{O2} = K_{O2} \times Q_a$$

where $K_{O2}$ (= constant) represents a concentration of oxygen and $Q_a$ represents an intake air flow amount. Accordingly, from the expression (4), the oxygen storage volume $V_{O2}$ can be calculated by the following equation:

$$V_{O2} = K_{O2} \times \{\Delta T_s - \Delta D_{Gas}\} / \left( \frac{1}{Q_a} - \frac{1}{Q_a'} \right) \quad (5)$$

Since all the quantities appearing on the right side of the above equation (5) can be detected, it is possible to determine the oxygen storage volume $V_{O2}$ from the above equation (5).

Now, referring to the flow charts shown in FIGS. 5 and 6, a description will be made of the processing for detecting the purification factor u of the TWC 15 which processing is performed by the CPU 103.

Figure 5:
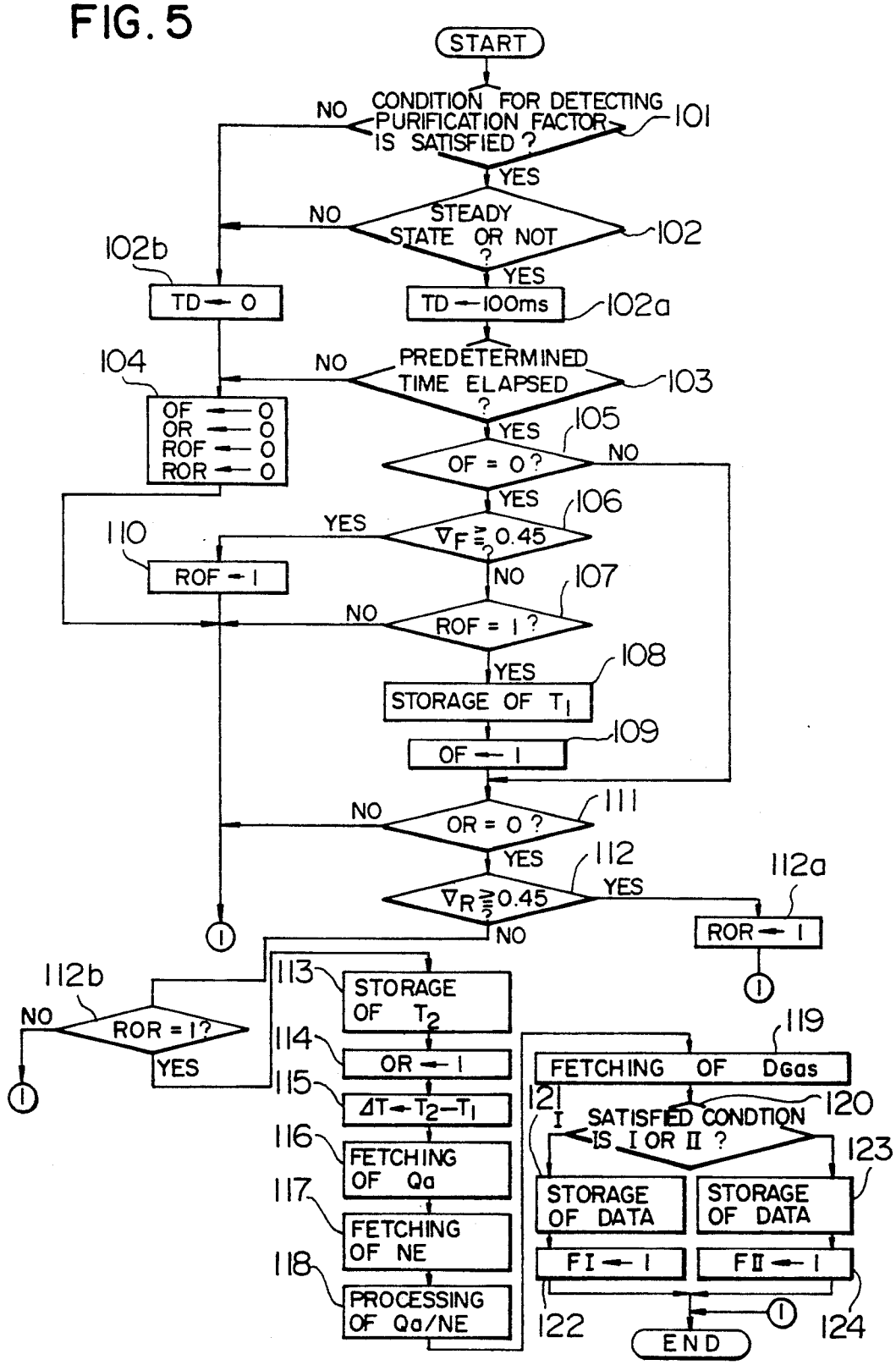
FIGS. 5 and 6 are flow charts for explaining the operation of the purification factor detecting apparatus of the embodiment of the present invention.
Figure 6:
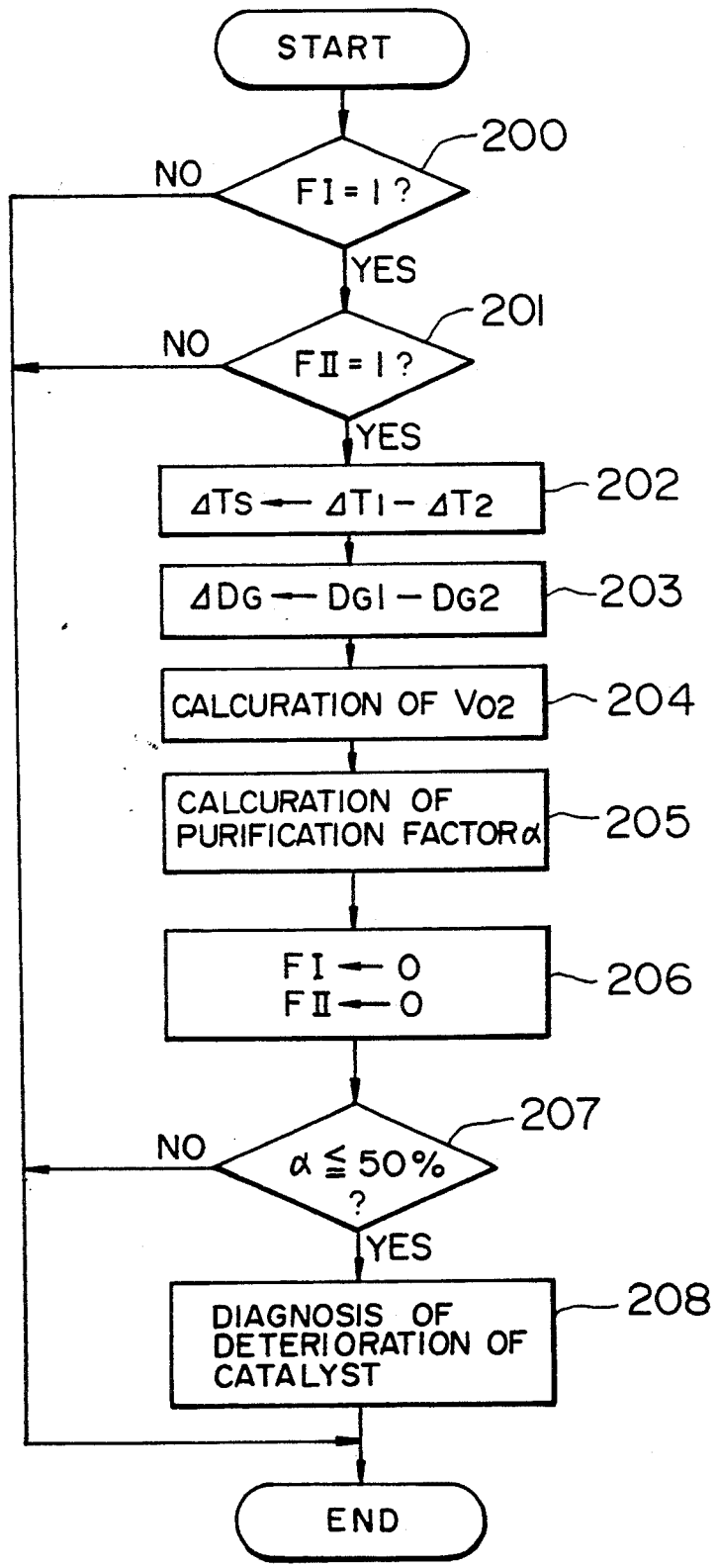

FIG. 5 is a flow chart for illustrating a procedure for detecting the first and second response delay time differences $\Delta T_1$ and $\Delta T_2$, respectively.

Figure 7:
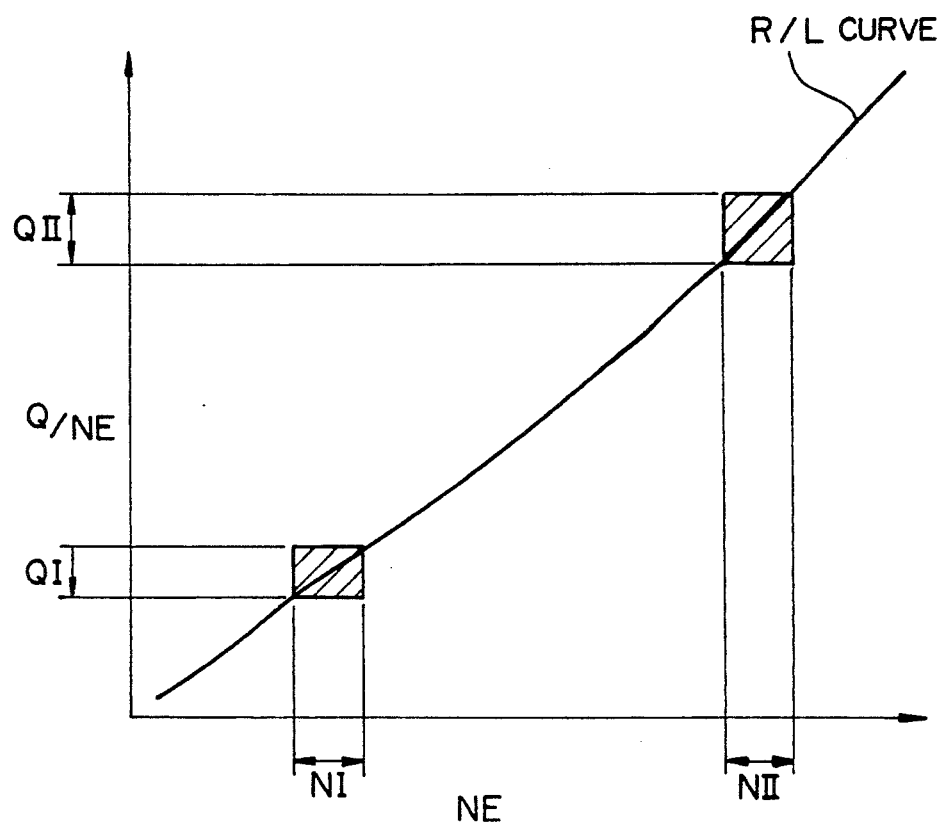
FIG. 7 is a characteristic diagram showing an R/L characteristic curve.

First, at a step 101, a decision is made as to which one of first and second conditions for detecting the purification factor is satisfied by the operating state of the engine. The purification factor detecting conditions are defined in terms of the rotational speed NE, engine load Q/NE, etc. By way of example, referring to FIG. 7 showing a so-called road/load (R/L) line, the first purification factor detecting condition is satisfied when the rotational speed NE is within a predetermined range N I and when the engine load is within a predetermined range Q I, while, the second purification factor detecting condition is satisfied when the rotational speed is within a predetermined range N II and when the engine load is within a predetermined range Q II, as indicated by hatched areas in FIG. 7. Parenthetically, the R/L line or curve represents a characteristic relation between the rotational speed NE and the engine load Q/NE in a normal or steady operating state of the engine.

When it is decided at the step 101 that the engine operating state satisfies none of the first and second purification factor detecting conditions, the processing proceeds to a step 102b. On the other hand, when either the first or the second purification factor detecting condition is satisfied, detection is made as to whether the engine is in a steady operating state or not, at a step 102. Detection of the steady operating state can be made by detecting the magnitude of a variation in the engine load Q/NE or the like parameter. Unless the engine is in a steady operating state, a delay time TD is reset to zero (TD←"0") at a step 102b, thereafter the processing proceeds to a step 104. Parenthetically, the delay time TD represents a processing delay time.

On the other hand, when it is decided at the step 102 that the engine is in a steady state, the delay time is set to 100 ms (TD←100 ms) at a next step 102a. Subsequently, in a succeeding step 103, it is determined whether or not a predetermined time (e.g. 10 seconds in the case of the instant embodiment) has elapsed from the time point at which TD was set to 100 ms. If not (NO), the processing proceeds to a step 104 where flags OF and OR indicating the detection states of the response delay times $T_1$ and $T_2$ are reset (OF←"0" and OR←"0"), respectively. Additionally, a flag ROF representing that the rich state is indicated by the output of the first $O_2$-sensor 16 is reset (ROF←"0") and at the same time a flag ROR representing that the rich state is indicated by the output of the second $O_2$-sensor 18 is reset (ROR←"0"), whereupon the processing comes to an end.

On the other hand, when it is determined at the step 103 that the predetermined time has elapsed (YES), the processing proceeds to a step 105 for detecting the state of a flag OF. This flag OF indicates a state of detection of the response delay time $T_1$ of the first $O_2$-sensor 16. When the flag OF is set (i.e. OF="1"), indicating that the response delay time $T_1$ has already been detected, the processing proceeds to a step 111. On the other hand, when it is decided at the step 105 that the flag OF is reset (i.e. OF="0"), indicating that the response delay time $T_1$ has not yet been detected, the processing proceeds to a step 106, where detection is made to determine whether or not the output voltage $V_F$ of the first $O_2$-sensor 16 is lower than 0.45 V. Here, it should be noted that the output voltage of the $O_2$-sensor changes around the voltage value of 0.45 V (a comparison reference voltage) as a function of the air-fuel ratio, as can be seen from FIG. 4. When the output voltage $V_F$ is lower than 0.45 V, it can then be decided that the output of the first $O_2$-sensor 16 indicates a lean state at the instant control time point. Thus, when the output voltage $V_F$ is decided to be lower than 0.45 V at the step 106, the processing proceeds to a step 107 and a decision is made as to whether or not the flag ROF is "1". When ROF="1", it can then be decided that the output of the first $O_2$-sensor 16, which indicated a rich state at the preceding control time point, is now indicating a lean state. Accordingly, when the flag ROF is "1" at the step 107, the processing proceeds to a step 108. Otherwise, when the flag ROF is not "1" at the step 107, this control routine comes to an end. At the step 108, the time at that time point is stored as the response delay time $T_1$, and then the flag OF is set (OF←"1") at a succeeding step 109. the processing then proceeds to a step 111.

When it is decided at the step 106 that the output voltage $V_F$ is equal to or higher than 0.45 V, the processing proceeds to a step 110. At this step 110, the flag ROF is set to "1", and then this routine comes to an end. At the step 111, the state of the flag OR is detected, as described above with respect to the step 105. The flag OR indicates the state of the detection of the response delay time $T_2$ of the second $O_2$-sensor 18. When this flag OR is set (OR ="1"), indicating that the response delay time $T_2$ has already been detected, the instant processing comes to an end. On the other hand, when it is found at the step 111 that the flag OR is in the reset state (OR ="0") indicating that the response delay time $T_2$ has not yet been detected, the processing proceeds to a step 112. At this step 112, a decision is made as to whether the output voltage $V_R$ of the second $O_2$-sensor 18 is lower than 0.45 V or not, as in the case of the step 106 described above. When the output voltage $V_R$ is equal to or higher than 0.45 V, the processing proceeds to a step 112a where the flag ROR is set to "1", and then the processing comes to an end.

Figure 8:
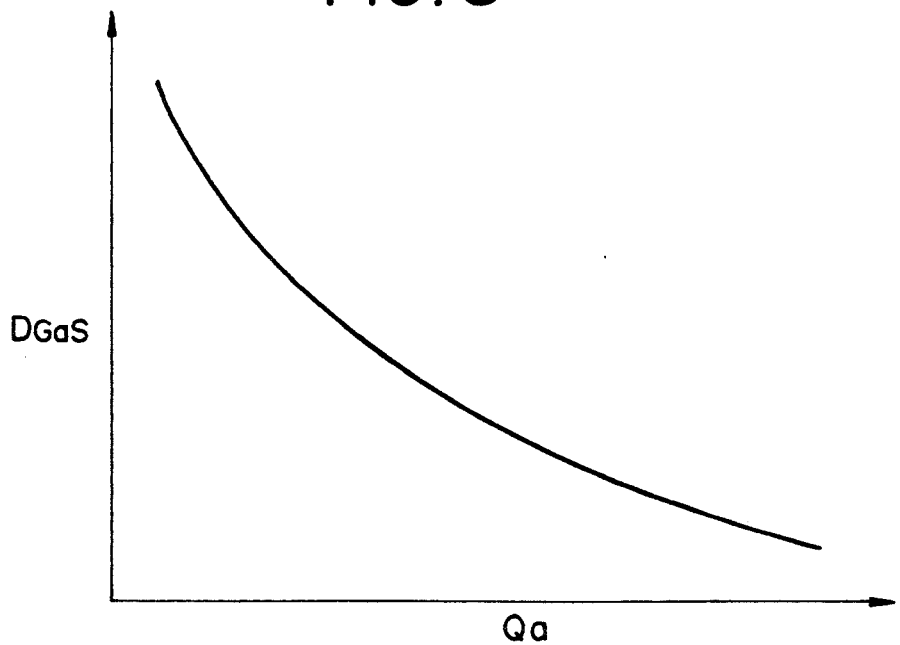
FIG. 8 is a characteristic diagram showing an exhaust gas delay time.

When it is decided that the output voltage $V_R$ is lower than 0.45 V at the step 112, it is decided that the output of the second $O_2$-sensor 18 is reversed at the instant control time point from a level indicating a rich state to a level indicating a lean state. Then, the processing proceeds to a step 112b to make a decision as to whether the flag ROR is "1" or not. If the flag OR is not "1", the processing comes to an end. While, if the flag OR is "1", the processing proceeds to a step 113 where the time at that time point is stored as the response delay time $T_2$. At a next step 114, the flag OR is set (OR Δ"1"). Subsequently, at a step 115, the response delay time deference $\Delta T (= T_2 - T_1)$ is calculated on the basis of the response delay times $T_1$ and $T_2$ stored at the aforementioned steps 108 and 113, respectively. At a succeeding step 116, the intake air flow amount $Q_a$ is read in. Further, at a step 117, the engine rotational speed NE is read in. Subsequently, at a step 118, the engine load $Q_a/NE$ is calculated on the basis of the intake air flow amount $Q_a$ and the rotational speed NE. At a step 119, the gas delay time $D_{Gas}$ is obtained from the rotational speed NE and the engine load $Q_a/NE$. FIG. 8 illustrates a characteristic relation between the gas delay time $D_{Gas}$ and the intake air flow amount $Q_a$. As can be seen from FIG. 8, the gas delay time $D_{Gas}$ decreases as the engine load and the rotational speed increase. Concerning a method of setting the gas delay time $D_{Gas}$, it may be considered to obtain by an experiment or emprically beforehand the gas delay time $D_{Gas}$ as a function of the engine rotational speed NE and the engine load $Q_a/NE$ and to store the results thus obtained in the ROM 104 in the form of a two-dimensional map so that the stored gas delay time $D_{Gas}$ can be read out sequentially from the ROM 104.

Now, at a step 120, a decision is made as to which one of the first and second purification factor detecting conditions has been satisfied at the step 101. When the first purification factor detecting condition has been satisfied, the processing proceeds to a step 121. At the step 121, the various data obtained as mentioned above are newly set as shown below so as to be stored subsequently in the RAM 105.

$$\Delta T_1 \leftarrow \Delta T, \ QI \leftarrow Q_a, \ D_{Gas}1 \leftarrow D_{Gas}$$

At a step 122, a flag FI indicating the state of the detection of the response delay time difference $\Delta T_1$ under the first purification factor detecting condition is set (FI←"1").

When it is decided at the step 120 that the second purification factor detecting condition has been satisfied at the step 101, the processing proceeds to a step 123. At the step 123, the various data are newly set as shown below in the manner similar to that of the step 121 so as to be stored in the RAM 105.

$$\Delta T_2 \leftarrow \Delta T, \ QII \leftarrow Q_a, \ D_{Gas}2 \leftarrow D_{Gas}$$

Subsequently, at a step 124, a flag F II indicating the state of the detection of the response delay time difference $\Delta T_2$ under the second purification factor detecting condition is set (F II←"1").

Next, referring to a flow chart shown in FIG. 6, a description will be made of the detection of a purification factor of the catalyst and the diagnosis of the deterioration of the catalyst on the basis of the response delay time differences $\Delta T_1$ and $\Delta T_2$ detected through the procedure described above.

At first, the states of the flags F I and F II are detected at steps 200 and 201, respectively. Only when both the flags F I and F II are set, indicating that the response delay time differences $\Delta T_1$ and $\Delta T_2$ have been detected, the detection of a purification factor is carried out in accordance with the processing including step 202 et seq..

At the step 202, a deviation or difference $\Delta T_s$ between the response delay time differences $\Delta T_1$ and $\Delta T_2$ is obtained ($\Delta T_s = \Delta T_1 - \Delta T_2$). At a next step 203, a difference $\Delta D_{Gas}$ between the first and second exhaust gas delay times $D_{Gas}1$ and $D_{Gas}2$ is obtained ($\Delta D_{Gas} = D_{Gas}1 - D_{Gas}2$). subsequently, at a step 204, an oxygen storage volume $V_{02}$ of the TWC 15 is calculated by the following expression:

$$V_{02} \leftarrow K_{02} \cdot (\Delta T_s - \Delta D_{Gas}) / \left( \frac{1}{QI} - \frac{1}{QII} \right)$$

where $K_{02}$ represents an oxygen concentration of the exhaust gas, which is a constant, since the control of an air-fuel ratio is performed by making reference to the stoichiometric air-fuel ratio.

At a step 205, a purification factor $\alpha$ is calculated on the basis of the oxygen storage volume $V_{02}$ which has been calculated at the step 204. As described hereinbefore, the purification factor $\alpha$ has such a characteristic relation with the oxygen storage volume $V_{02}$ as illustrated in FIG. 3. Subsequently, at a step 206, the flags F I and F II are reset (F I←"0", F II←"0"). Thereafter, the detection of the deterioration of the TWC 15 is performed at a step 207. More specifically, it is decided whether the purification factor $\alpha$ of the TWC 15 obtained through the procedure described above is equal to or greater than a predetermined value (50% in the case of the illustrated embodiment). When the purification factor $\alpha$ of the TWC 15 is smaller than the predetermined value, it is then decided that the TWC 15 has been degraded, and then the processing proceeds to a step 208 to carry out various diagnostic processings with respect to the deterioration of the catalyst. The diagnostic processings include, for example, the storing of the catalytic deterioration information in the back-up RAM 106 and the actuation of the alarm 19 shown in FIG. 2.

By way of the described above, the purification factor $\alpha$ of the TWC 15 is detected on the basis of the deviation $\Delta T_s$ between the first and second response delay times $\Delta T_1$ and $\Delta T_2$, which deviation has been detected in respective different engine operating states. Thus, by virtue of the procedure according to the present invention, the purification factor $\alpha$ of the TWC 15 can be detected regardless of the response times inherent to the first and second $O_2$-sensors, respectively. As a result, the purification factor $\alpha$ of the TWC 15 can be detected with improved accuracy.

Referring to FIG. 3, it can be seen that the characteristic curve representing the relation between the purification factor o and the oxygen storage volume $V_{02}$ of the TWC has a steep slope particularly in the low value region of the purification factor. Accordingly, the detection of a purification factor $\alpha$ based on the oxygen storage volume $V_{02}$ can be made with higher detection accuracy especially in the low value region of the purification factor $\alpha$. Thus, the degradation or deterioration of the TWC 15 can be accomplished with high accuracy.

In the case of the embodiment described above, the response delay time deviation $\Delta T_s$ is obtained on the basis of the first and second response delay times $T_1$ and $T_2$. It should however be noted that the response delay time deviation $\Delta T_s$ between the respective different engine operation states may be detected on the basis of a difference in phase of the outputs of the first and second $O_2$-sensors 16 and 18 at the time when the conditions at the above-described steps 101 to 103 are satisfied.

Now, a description will be made of feedback control of the air-fuel ratio.

(1) Processing of F/B correction coefficient

Figure 9:
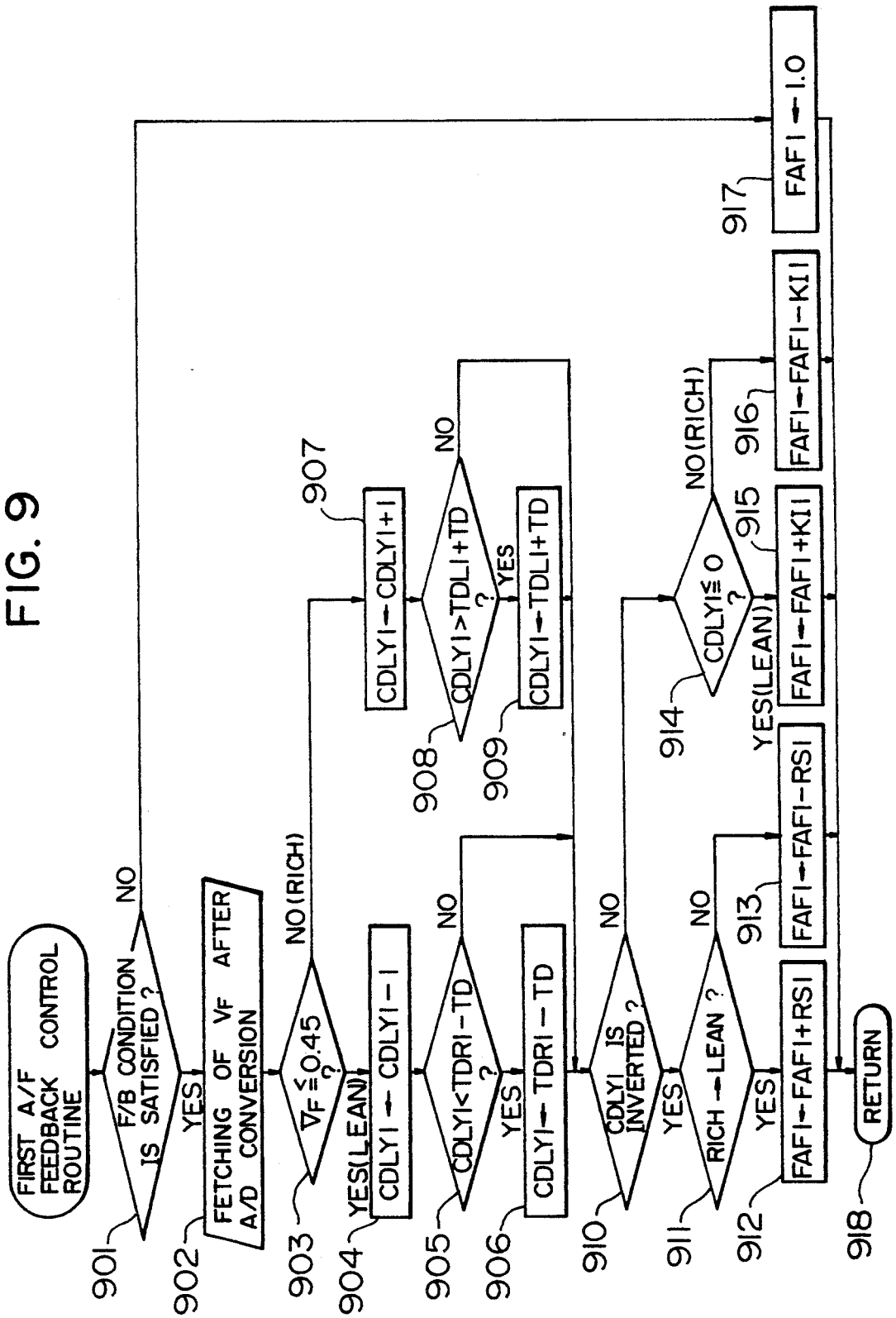
FIG. 9 is a flow chart illustrating a routine for processing a feedback (F/B) correction coefficient by using a computer incorporated in the detecting apparatus of the embodiment.

FIG. 9 is a flow chart illustrating an air-fuel ratio feedback control routine for calculating a feedback (F/B) correction coefficient FAF1 of the air-fuel ratio on the basis of the output of the first $O_2$-sensor 16. This routine is executed at predetermined time intervals, for example, 4 ms.

Referring to FIG. 9, a decision is made at a step 901 as to whether the condition of the closed loop (feedback) control on the basis of the output of the first $O_2$-sensor 16 is established or not. In this connection, it is noted that the closed loop condition can not be satisfied under such conditions as during an engine starting operation, during fuel increasing operations after the start of the engine operation, during a warming-up operation, during a power-up operation, during lean control, during an inactive state of the first $O_2$-sensor 16, etc. Otherwise, the condition of the closed loop (feedback) control is satisfied. Parenthetically, the discrimination between the active and inactive states of the first $O_2$-sensor 16 can be made by reading the water temperature data THW from the RAM 105 and deciding whether the relation THW $\geq 70°$ C. has once been satisfied or not, or alternatively by detecting whether the output level of the first $O_2$-sensor has once experienced up-and-down fluctuation.

Unless the closed loop condition is satisfied, the processing proceeds to a step 917 where the F/B correction coefficient FAF1 is set to "1.0". On the other hand, when the closed loop condition is satisfied, the processing proceeds to a step 902.

At the step 902, the output $V_F$ of the first $O_2$-sensor 16 is fetched after being subjected to A/D conversion, which is then followed by a step 903 at which a decision is made as to whether the output $V_F$ of the first $O_2$-sensor 16 is equal to or lower than 0.45 V (a comparison reference voltage). In other words, it is decided whether the air-fuel ratio is in a rich state or in a lean state.

When the air-fuel ratio is in a lean state (namely when $V_F \leq 0.45$ V), a first delay counter CDLY1 is guarded by a minimum value TDR1−TD through processing steps 905 and 906. In other words, when the count value of CDLY1 becomes smaller than the minimum value TDR1−TD, the former is then replaced by the latter. Incidentally, the minimum value TDR1−TD represents a rich delay time for maintaining a decision of the lean state even when the output of the first $O_2$-sensor changes from a lean level to a rich level. The minimum value TDR1−TD is defined to have a negative value.

Further, as once appeared in the steps 102a and 102b in FIG. 5, the term TD represents a manipulation quantity for changing the period of F/B and has a positive value. Hereinafter, this quantity TD will be referred to as the delay manipulating quantity.

Now, when the air-fuel ratio is in a rich state (namely, when $V_F > 0.45$ V), the first delay counter CDLY1 is incremented by "1" at a step 907, and then the value of the first delay counter CDLY1 is guarded by a maximum value TDL1+TD, namely, by being replaced by TDL1+TD, so that the former is inhibited so as not to exceed the latter at steps 908 and 909. The maximum value TDL1+TD represents a lean delay time for maintaining a decision of a rich state even when the output of the first $O_2$-sensor 16 changes from a rich level to a lean level. The maximum value TDL1+TD is defined to have a positive value, wherein the term TD represents the delay manipulating quantity, as described with respect to the steps 905 and 906.

Here, the reference value of the first delay counter CDLY1 is selected to be "0". When CDLY1>0, the air-fuel ratio after the delay processing is regarded to be in a rich state, while, it is regarded to be in a lean state when CDLY1≦0.

At a step 910, a decision is made as to whether the sign of the first delay counter CDLY1 is inverted or not. In other words, it is decided whether the state of the air-fuel ratio after the delay processing is inverted or not. If it has been inverted, a decision is made at a step 912 as to whether the inversion is from a rich state to a lean state or vice versa. When it is from a rich state to a lean state, the F/B correction coefficient FAF1 is increased skipwise to FAF1 + RS1 at a step 912, and if otherwise, the F/B correction coefficient FAF1 is decreased skipwise to FAF1 − RS1. In other words, a stepwise processing is performed.

When it is detected at the step 910 that the sign of the first delay counter value CDLY1 has not been inverted, an accumulation processing is performed at steps 914, 915 and 916. More specifically, it is decided whether CDLY1≦0 holds or not at the step 914. When CDLY1≦0 holds, indicating a lean state, then FAF1 is incremented by KI1 (FAF1←FAF1+KI1) at the step 915, while, when CDLY1 >0 holds, indicating a rich state, then FAF1 is decremented by KI1 (FAF1←FAF1−KI1). Here, it should be noted that the integration constant KI1 is sufficiently small as compared with the skip constant RS1, namely, KI1<<RS1 holds. Thus, at the step 915, the fuel injection quantity is gradually increased, starting from a lean state (CDLY1=0), while, at the step 916, the fuel injection quantity is gradually decreased, starting from a rich state (CDLY1>0).

The F/B correction coefficient FAF1 processed at the steps 912, 913, 915 and 916 is guarded by a minimum value, for example 0.8, as well as by a maximum value, for example 1.2, in order for preventing the F/B correction coefficient FAF1 from increasing or decreasing excessively for some reason and hence preventing the air-fuel ratio control from giving rise to an over-rich state or an over-lean state.

As described above, the F/B correction coefficient FAF1 thus calculated is stored in the RAM 105, and the routine under consideration comes to an end at a step 918.

Figure 10:
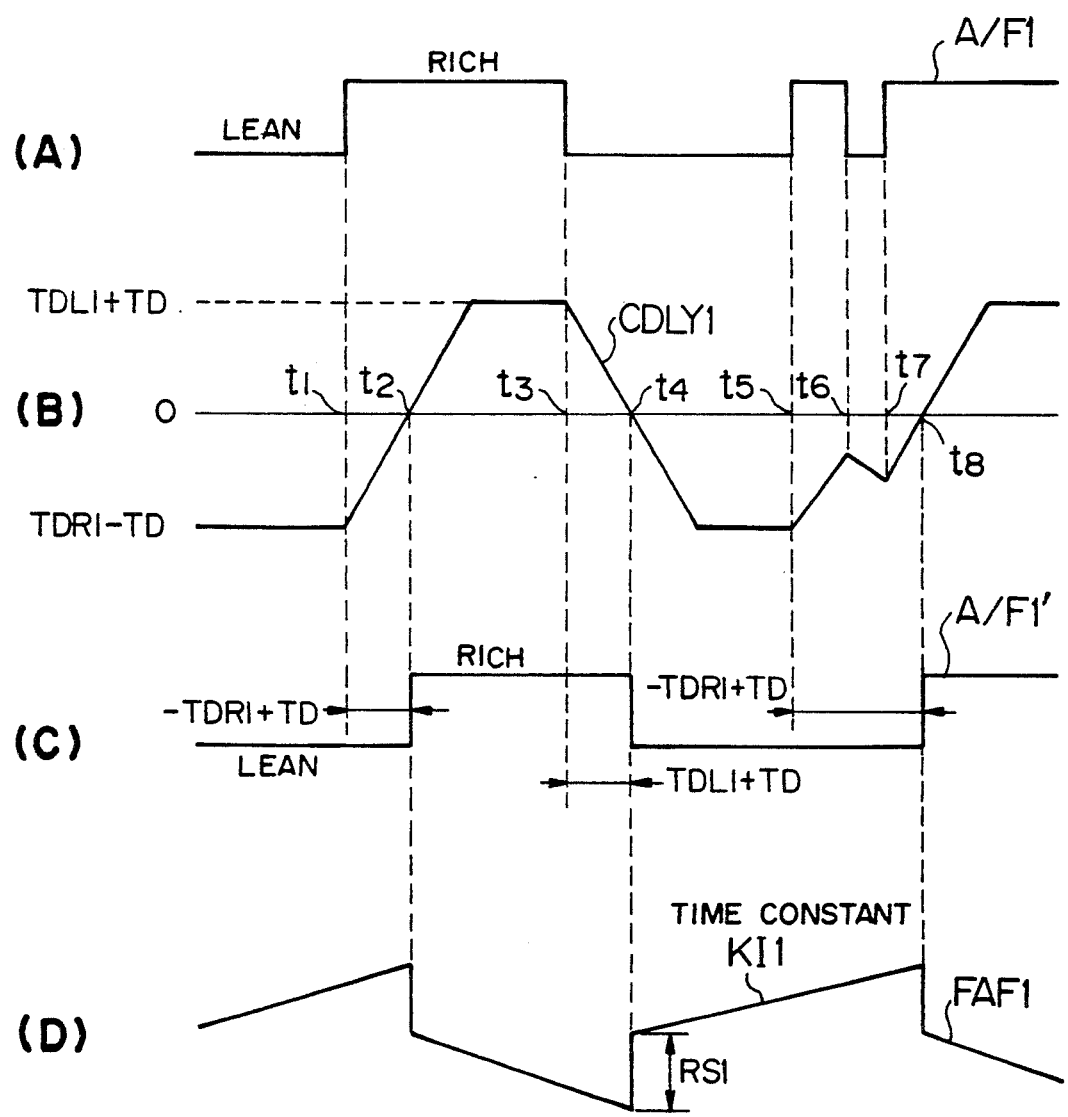
FIG. 10 is a timing chart illustrating the procedure with time for processing the feedback correction coefficient.

FIG. 10 is a timing diagram for explaining supplementally the operations described above with reference to the flow chart of FIG. 9. Referring to FIG. 10, there is shown at (A) an air-fuel ratio signal A/F1 for discriminating a rich state and a lean state from each other, which signal is obtained from an output of the first $O_2$-sensor 16. In the rich state indicated by this signal A/F1, the first delay counter CDLY1 is counted up, while it is counted down in the lean state, as shown at (B) in FIG. 10. As a result, there is produced a delayed air-fuel ratio signal A/F1' having such a waveform as shown at (C) in FIG. 10.

By way of example, even when the air-fuel ratio signal A/F1 changes from a lean level to a rich level at a time point $t_1$, the delayed air-fuel ratio signal A/F1' is held at a lean level for the rich delay time (−TDR1+TD) and then changes to a rich level at a time $t_2$. Similarly, even when the air-fuel ratio signal A/F1 changes from a rich level to a lean level at a time point $t_3$, the delayed air-fuel ratio signal A/F1' is held at a rich level for a period represented by the lean delay time (TDL1+TD) and then changes to a lean level at a time point t4.

However, when the air-fuel ratio signal A/Fl changes or inverts its level at a time interval shorter than the rich delay time (−TDR1+TD), as indicated at t5, t6 and t7 in FIG. 10(B), a time is required for the first delay counter CDLY1 before crossing the reference value 0, which results in that the air-fuel ratio signal A/Fl', which has been subjected to the delay processing, is inverted at a time point t8. Thus, the delayed air-fuel ratio signal A/Fl' after being subjected to the delay processing becomes more stable than the air-fuel ratio signal A/Fl before being subjected to the delay processing. In this manner, the F/B correction coefficient signal FAF1 shown at (D) in FIG. 10 can be obtained on the basis of the air-fuel ratio signal A/Fl' stabilized through the delay processing described above.

(2) Modification of F/B correction coefficient by second O2-sensor 18

Next, a description will be made of a second air-fuel ratio feedback control by using the second O2-sensor 18. To this end, there are provided two systems. A first system introduces a second feedback F/B correction coefficient FAF2 of the air-fuel ratio. In a second system, either the delay times (−TDR1+TD), (TDL1+TD), the skip quantity RS1 (including a rich skip quantity RS1R representing a skip from a lean level to a rich level and a lean skip quantity RS1L representing a skip from a rich level to a lean level, respectively) and the integration constant KI1 are set separately, or the comparison reference voltage for the output $V_F$ of the first O2-sensor 16 is made variable.

By way of example, when the rich delay time (−TDR1+TD) is set to be longer than the lean delay time (TDL1+TD), namely, (−TDR1+TD)>(TDL1+TD), then the air-fuel ratio under control tends to shift to the rich side. On the contrary, when the lean delay time (TDL1+TD) is set to be longer than the rich delay time (−TDR1+TD), namely (TDL1+TD)>(−TDR1+TD), then the air-fuel ratio under control tends to shift to the lean side. In other words, the air-fuel ratio can be controlled by modifying the delay times (−TDR1+TD) and (TDL1+TD) in accordance with the output of the second O2-sensor.

Figure 11:
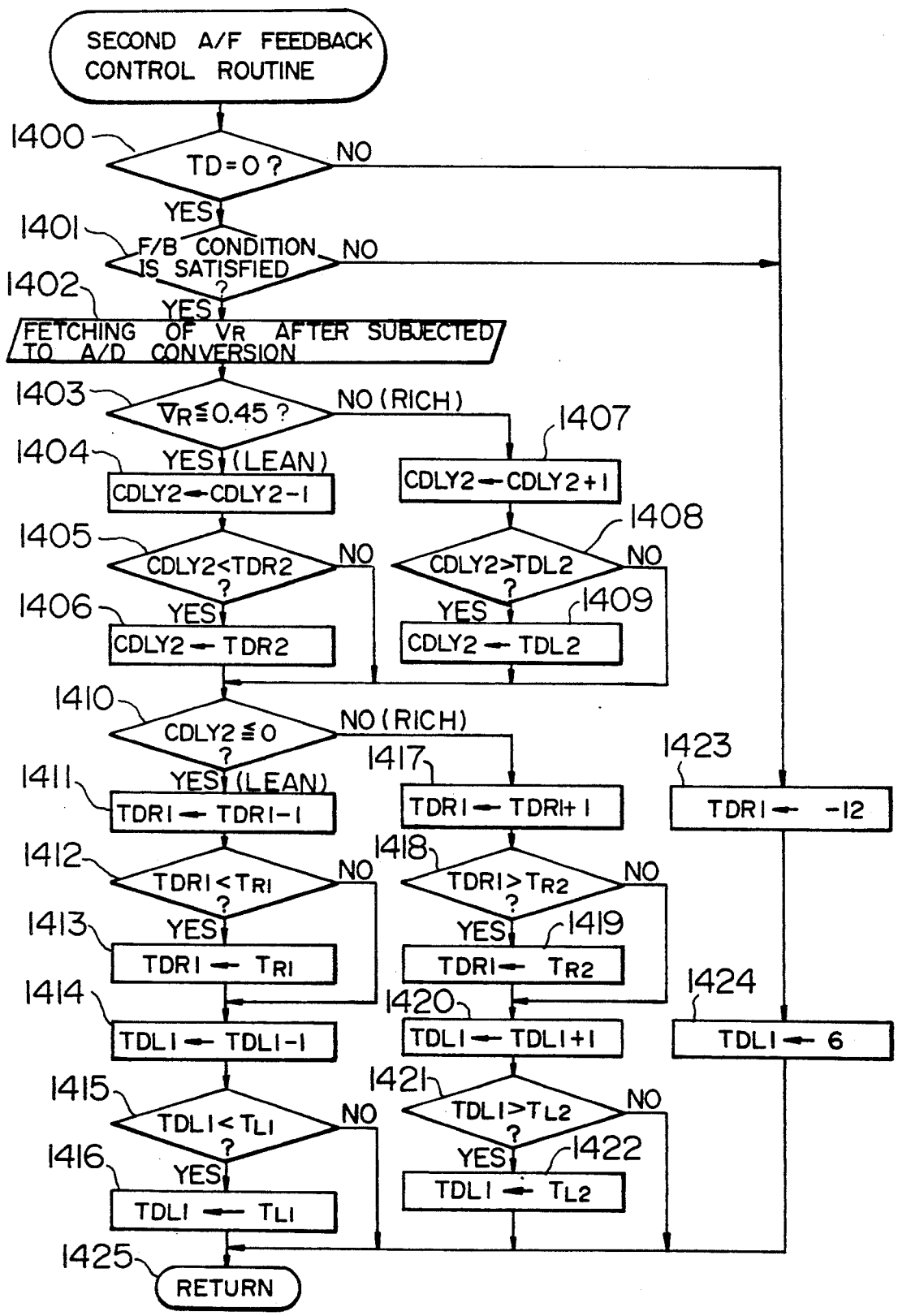
FIG. 11 is a flow chart illustrating a second air-fuel ratio feedback control routine for calculating a delay time from the feedback correction coefficient by the computer.

FIG. 11 is a flow chart illustrating a second air-fuel ratio feedback control routine for calculating the delay times TDR1 and TDL1 on the basis of the output of the second O2-sensor 18, which routine is executed at predetermined time intervals, for example, 1 second. At a step 1400, a decision is made as to whether the deterioration of the TWC is being detected by using the delay manipulation quantity TD. At a step 1401, a decision is made as to whether the closed loop condition of the air-fuel ratio is satisfied or not, as described hereinbefore with respect to the step 901 shown in FIG. 9.

When it is decided that the detection of the deterioration of the catalyst is being carried out or the closed loop condition is not satisfied, the processing proceeds to steps 1423 and 1424 where the rich delay time TDR1 and the lean delay time TDL1 are set to constant values, respectively, as exemplified below:

TDR1←−12 (corresponding to 48 ms)

TDL1←6 (corresponding to 24 ms)

The reason why the rich delay time (−TDR1) is set to be longer than the lean delay time (TDL1) is that the comparison reference value is set to have a small value (e.g. 0.45 V) belonging to the lean side.

When no deterioration of the catalyst takes place and the closed loop condition is satisfied, the processing proceeds to a step 1402.

Steps 1402 to 1409 shown in FIG. 11 correspond to the steps 902 to 909 shown in FIG. 9. A decision as to a rich state or a lean state is made at the step 1403, and then the result of this decision is subjected to the delay processing at the steps 1404 to 1409, which is then followed by a decision as to a rich state or a lean state of the result of the delay processing at the step 1410.

At the step 1410, a decision is made as to whether the second delay counter CDLY2 is equal to or smaller than zero (CDLY2≦0). When CDLY2≦0 holds, it is decided that the air-fuel ratio is in a lean state, and then the processing proceeds through steps 1411 to 1416. While, when CDLY2>0 holds, it is decided that the air-fuel ratio is in a rich state, and then the processing proceeds through steps 1417 to 1422.

At the step 1411, the count TDR1 is decremented by "1"(namely, TDR1←TDR1−1) to thereby increase the rich delay time (−TDR1), as a result of which the change of the air-fuel ratio from a lean level to a rich level is further delayed to make the air-fuel ratio shift to the rich side. At the steps 1412 and 1413, TDR1 is guarded by a minimum value $T_{R1}$ which also has a negative value in this case. Accordingly, $(-T_{R1})$ represents a maximum rich delay time.

Further, at the step 1414, the count TDL1 is decremented by "1"(TDL1←TDL1−1). Thus, the lean delay time TDL1 is decreased to make the air-fuel ratio shift to the rich side by decreasing a delay in the change from a rich state to a lean state. At the steps 1415 and 1416, $T_{L1}$ has a positive value and it represents a minimum lean delay time.

When the air-fuel ratio is decided to be in a rich state at the step 1410, then the count TDR1 is incremented by "1"(namely, TDR1←TDR1+1). Thus, the rich delay time (−TDR1) is reduced to make the air-fuel ratio shift to the lean side by reducing a delay in the change from a lean state to a rich state. At the steps 1418 and 1419, TDR1 is guarded by a maximum value $T_{R2}$ which also has a negative value in this case. Accordingly, $(-T_{R2})$ represents a minimum rich delay time.

Further, at the step 1420, the count TDL1 is incremented by "1"(TDL1←TDL1+1). Thus, the lean delay time TDL1 is increased to make the air-fuel ratio shift from the rich side to the lean side by increasing a delay in the change from a rich state to a lean state. At the steps 1421 and 1422, TDL1 is guarded by a maximum value $T_{L1}$ which has a positive value in this case. Accordingly, $T_{L2}$ represents a maximum lean delay time.

The values of TDR1 and TDL1 calculated as described above are stored in the RAM 105, and then this routine comes to an end at a step 1425.

Further, although it has been described that the values of TDR1 and TDL1 have constant values at the steps 1423 and 1424, it should be noted that TDR1 and TDL1 may be values assumed immediately before the stoppage of the air-fuel ratio feedback control, mean values, or other values depending on other parameters such as a rotational speed NE, an intake air flow amount $Q_a$, an intake air pressure, an exhaust gas temperature, etc.. Further, the values of FAF1, TDR1 and TDL1 calculated during the air-fuel ratio feedback control may be converted to the other values of FAF1, TDR1 and TDL1 so that they are stored in the back-up RAM 106, thereby making it possible to improve the operability of the engine at the time of restart of the engine, etc.

Figure 12:
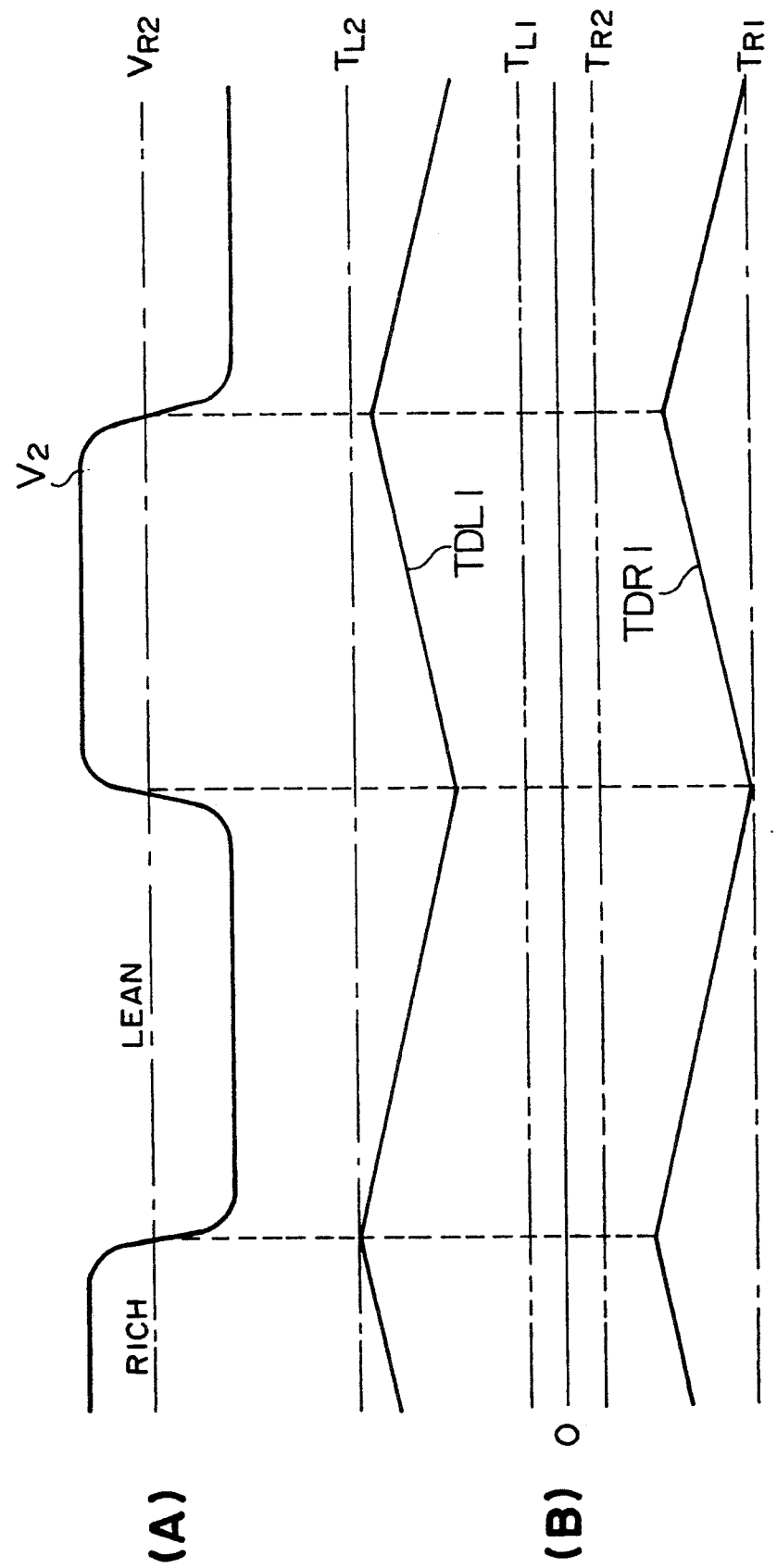
FIG. 12 is a timing diagram for illustrating changes in the rich and lean delay times to be set by the processing of the feedback correction coefficient.

FIG. 12 is a timing diagram showing the delay times TDR1 and TDL1 obtained through the procedure shown in FIG. 11. When the output voltage $V_R$ of the second O$_2$-sensor 18 changes as shown at (A) in FIG. 12, the delay times TDR1 and TDL1 are both reduced in the lean state ($V_R \leq 0.45$ V) as shown at (B) in FIG. 12, while the delay times TDR1 and TDL1 are both increased in the rich state. In this case, TDR1 varies within the range from $T_{R1}$ to $T_{R2}$, while TDL1 varies within the range from $T_{L1}$ to $T_{L2}$.

(3) Control of fuel injection time

Figure 13:
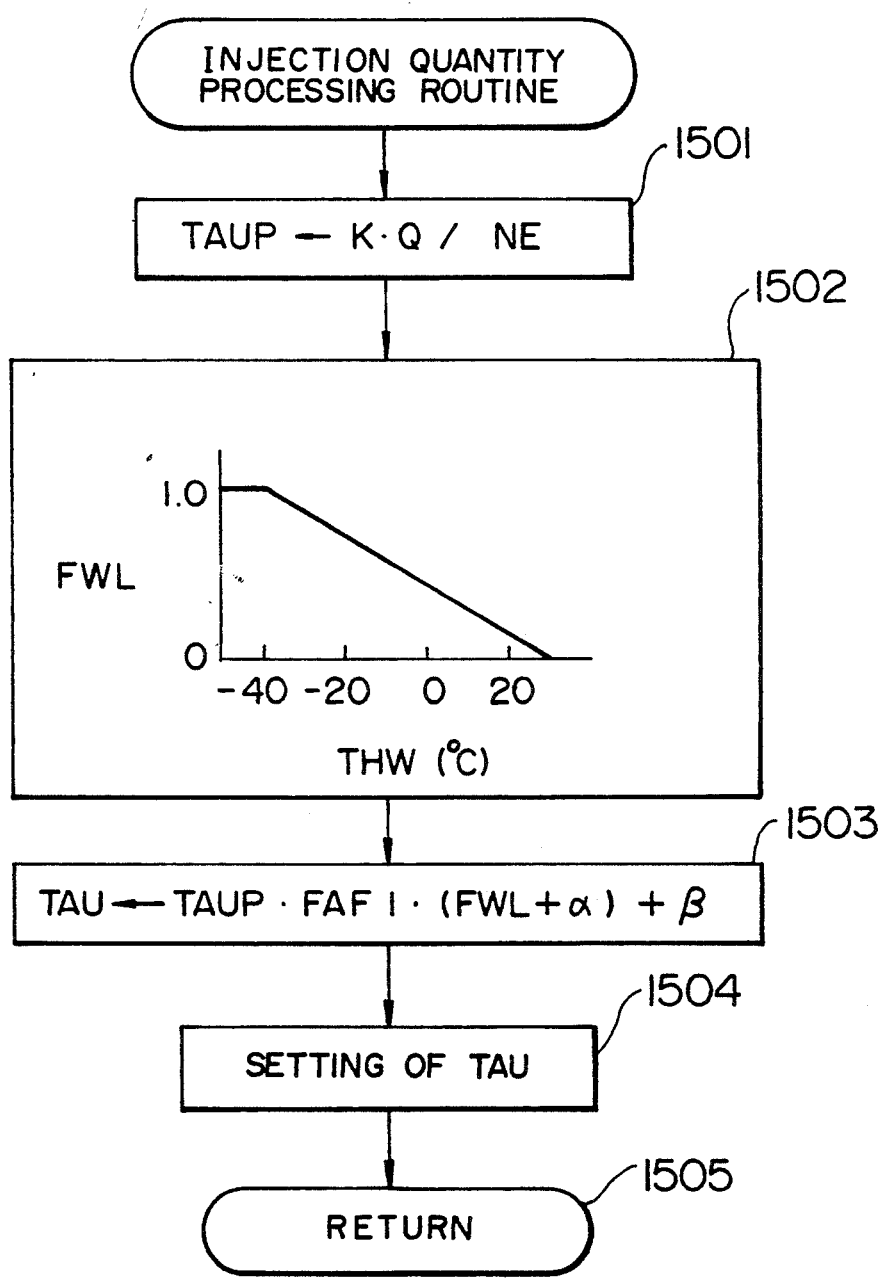
FIG. 13 is a flow chart illustrating a fuel injection time determining routine executed by the computer.

FIG. 13 is a flow chart illustrating an injection quantity processing routine which is executed at every predetermined crank angle of 360°, for example. Referring to FIG. 13, at a step 1501, the intake air flow amount data $Q_a$ and the rotational speed data NE are read out from the RAM 105 to calculate the basic fuel injection quantity TAUP. By way of example, the basic fuel injection quantity may be given by TAUP = K·Q/NE (where K is a constant). At a step 1502, the cooling water temperature data THW is read out from the RAM 105 and a warming-up increase of the fuel injection quantity FWL is calculated through an interpolation processing using a one-dimensional map stored in the ROM 104. At a step 1503, the final injection quantity TAU is calculated in accordance with the following relation.

$$TAU = TAUP \cdot FAF1 \cdot (FWL + \alpha) + \beta$$

where $\alpha$ and $\beta$ represent correction quantities determined by other operation state parameters.

Next, at a step 1504, the fuel injection quantity TAU is set at the down counter 104 and the flip-flop 109 is set simultaneously to thereby start fuel injection. At a step 1505, this routine is completed.

Figure 14:
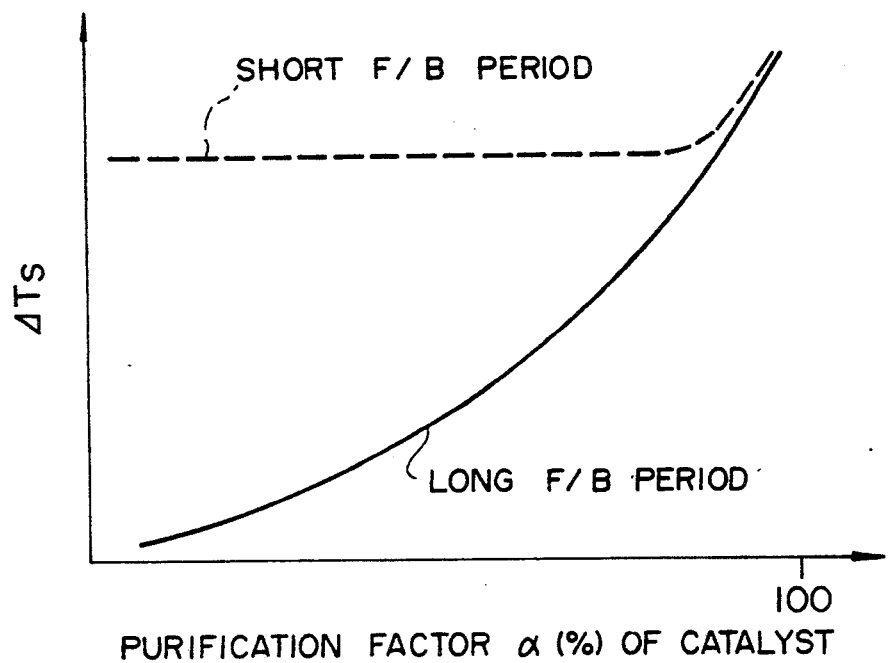
FIG. 14 is a characteristic diagram for graphically illustrating a relation between a deviation between first and second response delay time differences and the catalyst purification factor using a F/B control period as a parameter.
Figure 15:
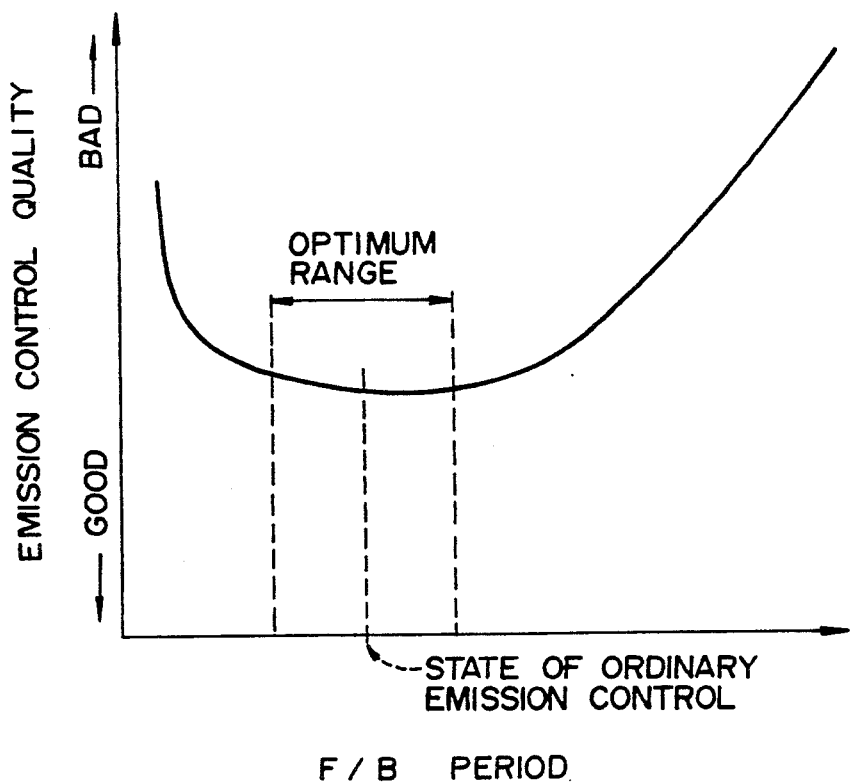
FIG. 15 is a characteristic diagram for illustrating a relation between the emission control quality and the F/B period in the A/F feedback control.

FIG. 14 illustrates a relation between the purification factor $\alpha$ of the catalyst and the deviation $\Delta T_s$ between the first and second response delay time differences in the outputs of the first and second O$_2$-sensors 16 and 18 detected in respective different operating states of the engine, with the F/B control period being used as a parameter. As is shown by a broken curve in FIG. 14, when the F/B period is shortened (with TD←0) as in the case of ordinary emission control, a change of the deviation $\Delta T_s$ as a function of the purification factor $\alpha$ becomes very small, making it difficult to measure the purification factor $\alpha$ on the basis of $\Delta T_s$. By contrast, when the F/B period is elongated (with TD←100 ms) as done in the embodiment of the present invention, as shown by a solid curve in FIG. 14, the deviation $\Delta T_s$ changes significantly as a function of the purification factor $\alpha$. Thus, the purification factor $\alpha$ can be obtained with high accuracy on the basis of the deviation $\Delta T_s$ between the first and second response delay time differences. FIG. 15 illustrates a relation between the F/B period and the emission control quality. As seen from FIG. 15, an optimum range of the F/B period is relatively narrow.

As will be appreciated from the foregoing description, the purification factor of the catalyst can be detected on the basis of the deviation between the first and second response delay time differences detected in respective different operation states of the engine. Thus, the purification factor can be detected independently of respective response times of the first and second oxygen sensors, which in turn provides an advantageous effect such that the purification factor of the catalyst can be detected with high accuracy.

We claim:

1. An apparatus for detecting a purification factor of a catalyst for use in an internal combustion engine, comprising:
   a catalyst disposed in an exhaust system of the internal combustion engine for purifying an exhaust gas;
   first and second air-fuel ration sensors disposed respectively upstream and downstream of said catalyst for detecting respective upstream and downstream air-fuel ratios;
   response delay time difference detecting means for detecting a first response delay time difference between said first and second air-fuel ratio sensors in a first operation state of said engine and for detecting a second response delay time difference between said first and second air-fuel ratio sensors in a second operation state of said engine; and
   purification factor detecting means for detecting a purification factor of said catalyst on the basis of a deviation between said first and second response delay time differences respectively detected in said first and second operation states of said engine.

2. A purification factor detecting apparatus according to claim 1, wherein said response delay time deference detecting means includes time difference detecting means for detecting a time difference between the inversion time of an output of said first air-fuel ration sensor and the inversion time of an output of said second air-fuel ratio sensor.

3. A purification factor detecting apparatus according to claim 1, wherein said purification factor detecting means includes gas delay time detecting means for detecting a first and second exhaust gas delay time respectively depending on said first and second operation states of said engine.

4. A purification factor detecting apparatus according to claim 1, further comprising:
   feedback correcting means for changing a feedback correction coefficient of a fuel injection time determining element in accordance with an output value of said first air-fuel ration sensor; and
   feedback correction coefficient control means for increasing a period, in which said feedback correction coefficient is changed, to be longer than a period at the time of ordinary emission control, when the purification factor of said catalyst is measured.

5. An apparatus for detecting a purification factor of a catalyst for use in an internal combustion engine, comprising:
   a catalyst disposed in an exhaust system of the internal combustion engine for purifying an exhaust gas;
   first and second air-fuel ratio sensors disposed upstream and downstream of said catalyst for detecting respective air-fuel ratios;
   response delay time deference detecting means for detecting differences in response delay time between said first and second air-fuel ratio sensors in respective different operation states of said engine, said response delay time difference detecting means including time deference detecting means for detecting a time difference between an inversion time of an output of said first air-fuel ratio sensor and an inversion time of an output of said second air-fuel ratio sensor;

purification factor detecting means for detecting a purification factor of said catalyst on the basis of a deviation between said first and second response delay time differences detected in respective different operation states of said engine;

feedback correcting means for changing a feedback correction coefficient of a fuel injection time determining element in accordance with an output value of said first air-fuel ratio sensor; and feedback correction coefficient control means for increasing a period, in which said feedback correction coefficient is changed, to be longer than a period at the time of ordinary emission control, when the purification factor of said catalyst is measured.

6. An apparatus for detecting a purification factor of a catalyst for use in an internal combustion engine, comprising:

a catalyst disposed in an exhaust system of the internal combustion engine for purifying an exhaust gas;

first and second air-fuel ratio sensors disposed upstream and downstream of said catalyst for detecting respective air-fuel ratios;

response delay time deference detecting means for detecting differences in response delay time between said first and second air-fuel ratio sensors in respective different operation states of said engine; and purification factor detecting means for detecting a purification factor of said catalyst on the basis of a deviation between said first and second response delay time differences detected in respective different operation states of said engine; wherein said different engine operation states are determined by means for detecting a first purification factor detecting condition where a rotational speed of said engine is within a first predetermined range and a load of said engine is within a first predetermined range and a second purification factor detecting condition where the rotational speed of said engine is within a second predetermined range and the load of said engine is within a second predetermined range, respectively, when said engine is in a steady operating state.

7. An apparatus for detecting a purification factor of a catalyst for use in an internal combustion engine, comprising:

a catalyst disposed in an exhaust system of the internal combustion engine for purifying an exhaust gas;

first and second air-fuel ratio sensors disposed upstream and downstream of said catalyst for detecting respective air-fuel ratios;

response delay time difference detecting means for detecting differences in response delay time between said first and second air-fuel ratio sensors in respective different operation states of said engine, wherein said response delay time difference detecting means includes time difference detecting means for detecting a time deference between an inversion time of an output of said first air-fuel ratio sensor and an inversion time of an output of said second air-fuel ratio sensor; and purification factor detecting means for detecting a purification factor of said catalyst on the basis of a deviation between said first and second response delay time differences detected in respective different operation states of said engine, wherein said different engine operation states are determined by means for detecting a first purification factor detecting condition where a rotational speed of said engine is within first predetermined range and a load of said engine is within a first predetermined range and a second purification factor detecting condition where the rotational speed of said engine is within a second predetermined range and the load of said engine is within a second predetermined range respectively, when said engine is in a steady operating state.

8. An apparatus for detecting a purification factor of a catalyst for use in an internal combustion engine, comprising:

a catalyst disposed in an exhaust system of the internal combustion engine for purifying an exhaust gas;

first and second air-fuel ratio sensors disposed upstream and downstream of said catalyst for detecting respective air-fuel ratios;

response delay time deference detecting means for detecting differences in response delay time between said first and second air-fuel ratio sensors in respective different operation states of said engine;

purification factor detecting means for detecting a purification factor of said catalyst on the basis of a deviation between said first and second response delay time differences detected in respective different operation states of said engine;

feedback correcting means for changing a feedback correction coefficient of a fuel injection time determining element in accordance with an output value of said first air-fuel ratio sensor; and feedback correction coefficient control means for increasing a period, in which said feedback correction coefficient is changed, to be longer than a period at the time of ordinary emission control, when the purification factor of said catalyst is measured, wherein said different engine operation states are determined by means for detecting a first purification factor detecting condition where a rotational speed of said engine is within first predetermined range and load of said engine is within a first predetermined range and a second purification factor detecting condition where the rotational speed of said engine is within a second predetermined range and the load of said engine is within a second predetermined range respectively, when said engine is a steady operating state.

9. An apparatus as in claim 1, wherein said operation state includes a particular rotational speed of the engine.

10. An apparatus as in claim 1, wherein said operation states are determined by load of the engine.

11. An apparatus as in claim 1, wherein said first operation state is when a rotational speed of the engine is within a first predetermined range and a load of the engine is within a second predetermined range and the second operational state is when the rotational speed is within a second predetermined range and the engine load is within a second predetermined range.

* * * * *